United States Patent Office 3,525,671
Patented Aug. 25, 1970

3,525,671
ANAEROBIC PHOTOSYNTHETIC FERMENTATION OF HYDROCARBONS
Donald O. Hitzman, Bartlesville, Okla., assignor to Phillips Petroleum Company, a corporation of Delaware
No Drawing. Filed Nov. 6, 1967, Ser. No. 681,023
Int. Cl. C12b *1/00, 1/20;* C12d *3/00*
U.S. Cl. 195—28                                                                 3 Claims

ABSTRACT OF THE DISCLOSURE

Cultivating photosynthetic micro-organisms anaerobically in the presence of light and a hydrocarbon having from 1 to 30 carbon atoms per molecule as the carbon source. Said process providing cultivated microorganisms and numerous metabolites such as decanol.

BACKGROUND OF THE INVENTION

Man's continued increase in number presents to the world as a whole the continued problem of food. Thus, much effort is continually being devoted to not only satisfying man's current needs but to find new ways of satisfying these needs in the future. One approach to this problem has been with microbial techniques.

It is known that microorganisms can oxidize and modify various hydrocarbons producing various products and chemicals and increase the cell yield to more protein. However, all of these reactions occur in the presence of air. It has been reported that anaerobic attack by hydrocarbons is possible by sulfate-reducing bacteria which are nonphotosynthetic organisms that derive their energy from sulfate reduction to sulfide. No other anaerobic systems for hydrocarbon modification are now known.

THE INVENTION

I have now discovered that hydrocarbons, preferably normally gaseous hydrocarbons such as natural gas and the like, can be photosynthetically converted by bacterial action into useful products under anaerobic conditions whereby the hydrocarbon serves as the source of carbon.

It is thus an object of the present invention to provide a process for the conversion of hydrocarbons utilizing photosynthetic organisms.

Another object of this invention is to provide an anaerobic process for the conversion of hydrocarbons wherein the hydrocarbon is utilized as the sourse of energy for the conversion.

Other aspects, objects, and the several advantages of this invention will be apparent to those skilled in the art from the disclosure and the appended claims.

In accordance with the present invention, anaerobic photosynthetic cultures are provided which utilize the provided hydrocarbons as their carbon source and light as a portion of the required energy source.

The term hydrocarbon as utilized in the context of the instant invention is intended to include any organic compound which is composed only of carbon and hydrogen atoms. Examples of such compounds are the normally gaseous hydrocarbons such as methane, ethane, propane. In addition, higher liquid hydrocarbons such as paraffinic hydrocarbons are also useful in the process of the invention.

It should be understood that in the course of the process of this invention the microorganism devours all or a portion of the particular hydrocarbon being utilized as the carbon source. Thus, in addition to the growth of the organism per se, as represented by the cells harvested from the culture medium, there is in addition a variety of by-products resulting from the normal conducting of the microbial process. Such by-products include vitamins, enzymes, acids, amino acids and alcohols, all of which can be recovered by conventional separation procedures.

In carrying out the process of this invention the hydrocarbon feed is added to the microorganism or commingled with the photosynthetic microorganism in a growth zone free of air. The organisms used in the instant process are those which have the property of utilizing the hydrocarbon in the presence of light under anaerobic conditions. The microorganisms utilize their intake materials not only for the multiplication of the microorganism cells in number but also for the increase in size of the cells themselves. The size increase is the result of the storing of protein, carbohydrates, fat, and other material by the individual cells, whereas the increase in number of cells or the population growth is in accordance with well-determined function. The weight increase of a culture of the photosynthetic microorganisms in a given period of time is thus due not only to an increase in size of the individual cells but, also, an increase in the number of cells because of propagation.

The resulting increase in either cell size or number represents a substantial supply of protein, carbohydrate, and fat material which was derived initially from the hydrocarbon feed which can be recovered or harvested by well known procedures to provide a variety of useful products.

The microorganisms preferably employed in the process of this invention are those of the family Athiorhodaceae genus Rhodopseudomonas and particularly the species capsulata, spheroides, palustris and gelatinoa. However, other microorganisms which are useful in the anaerobic, photosynthetic conversion of hydrocarbons include those of the family Thiorhodaceae genus Thiosarcina, Thiopedia, Thiocapsa, Thiodictyon, Thiothece, Thiocystis, Lamprocystis, Amoebobacter, Thiopolycoccus, Thiopirillum, Rhabdomonas, Rhodothece and Chromatium, family Athiorhodaceae genus Rhodospirillum and family Chlorobacteriaceae genus Chlorobium, Pelodictyon, Clathrochloris, Chlorobacterium, Chlorochromatium and Cylindrogloea.

In utilizing the hydrocarbon as the primary source of carbon for cellular growth as indicated by the increase in cell harvest, there is an addition produced through the growth process a variety of other compositions. Thus, for example, the resulting culture medium contains therein various growth by-products such as partially digested hydrocarbon, assimilated carbon products such as amino acid, enzymes, and various vitamins. Such medium can be treated by conventional procedures—extraction, distillation, etc.—for the recovery of these by-products.

The cellular produce harvested following the growth process is useful as a food supplement since it represents plant proteins. In addition, these cells can be utilized for the conversion of other materials such as the conversion of decane to decanol. Likewise, the cells can be used as a source of enzymes for other conversions.

The hydrocarbon conversion bacteria utilized in the present invention are anaerobic in character and thus avoid the necessity of having to have oxygen supplied thereto. Such a process then provides a ready procedure for production of protein material where oxygen is not available.

The microorganisms are photosynthetic in that light is essential to the obtaining of significant hydrocarbon conversion.

In carrying out the process of this invention, the incoming hydrocarbon is provided with or commingled with a photosynthetic microorganism or group of photosynthetic microorganisms. The mixture of hydrocarbon and organisms is maintained in a growth zone or fermenter for a predetermined period of time so as to permit adequate conversion of the hydrocarbon as represented by the increase in weight or number of the organisms. Generally a period of one to six days is sufficient to achieve sufficient increase in cell size or number to permit harvesting. The only limitations on the length of time the process can or is to be carried out is the size of the growth zone and the quantity of hydrocarbon available.

Preferably the aqueous nutrient medium in the fermenter is maintained at a desired pH by the step-wise or continuous addition of an aqueous medium of high pH.

For the growth of the microorganism there is provided, in addition to the hydrocarbon feedstock, an aqueous nutrient medium. Suitable nutrient mediums are of the type as illustrated in Example I.

While temperature is not a real factor in carrying out this invention, temperatures are preferred which normally promote or encourage growth of the organisms. Ordinarily the process is carried out at a temperature in the range of 20° C. to 55° C. The process is normally carried out at atmospheric pressure, although pressures within the range of 15 to 1500 p.s.i.g. can be employed.

Following the hydrocarbon conversion, the resulting cells are separated from the culture medium by any manner known to the art. One way is to centrifuge the medium, thereby flinging the cells to one side while permitting liquid material to pass on. The cells then are effectively dried and are available for many uses including human or animal consumption.

The liquid medium recovered from the system can be treated by any conventional means such as extraction or distillation to remove the various conversion by-products therefrom.

The following examples will further illustrate the invention.

EXAMPLE I

A series of anaerobic modifications using photosynthetic cultures were carried out in accordance with the present invention utilizing a mineral media yeast extract medium containing the following composition (grams/liter).

$(NH_4)_2SO_4$—0.5
$K_2HPO_4$—0.5
$MgSO_4 \cdot 7H_2O$—1.0
Yeast extract—0.1
Burris trace mineral mix—1 cc.
Tap water—1000 cc.

The culture medium, innoculated with the microorganism, was maintained at room temperature and at atmospheric conditions with fluorescent lighting provided to the growth zone having a 100% methane atmosphere.

Harvesting the culture after 7 days of incubation gave the following results:

| | | | Dry weight of cells | |
| --- | --- | --- | --- | --- |
| | Microorganism | Charge | (Grams/liter) recovered | Growth |
| Run No.: | | | | |
| 1 | Rhodopseudomonas gelatinosa | 0.05 | 0.55 | 0.50 |
| 2 | Rhodopseudomonas gelatinosa | 0.1 | 0.95 | 0.85 |

The above data demonstrate that cultivation of *Rhodopseudomonas gelatinosa* is achieved under anaerobic conditions utilizing methane as the carbon source.

EXAMPLE II

Another series of anaerobic cultivations were carried out in a manner similar to that of Example I wherein cultures of the indicated microorganisms were grown in a hexadecane yeast extract mineral medium with a nitrogen atmosphere and with fluorescent lighting. Each of the cultures was carried out at room temperature and pressure.

Harvesting the culture after 7 days of incubation gave the following results:

| Run No. | Microorganism | ATCC No. | Dry weight of cells | | |
| --- | --- | --- | --- | --- | --- |
| | | | Charge | (Grams liter) recovered | Growth |
| 1 | Rhodopseudomonas capsulata | 11166 | 0.1 | 1.3 | 1.2 |
| 2 | Rhodopseudomonas spheroides | 11167 | 0.15 | 0.7 | 0.55 |
| 3 | Rhodopseudomonas palustris | 11168 | 0.1 | 1.55 | 1.45 |
| 4 | Rhodopseudomonas gelatinosa | 11169 | 0.05 | 0.9 | 0.85 |

The above data indicate that cultivation of microorganisms under anaerobic conditions is possible utilizing a hydrocarbon such as hexadecane as the source of carbon.

The utilization of hydrocarbon feed to the process permits through microbial assimilation of the carbon thereof the production or growth of microorganisms which, in turn, are useful as a source of nutrients, such as food. Thus, the instant invention represents a process for the anaerobic mass culture of photosyntheic microorganisms. Such cell production represents, then, the production of protein containing organisms wherein sunlight is utilized as the source of energy for the growth of the cells.

Reasonable variations and modifications of this invention can be made, or followed, in view of the foregoing disclosure, without departing from the spirit or scope thereof.

I claim:

1. A process which comprises cultivating a photosynthetic microorganism in the presence of light and a hydrocarbon having from 1 to 30 carbon atoms therein in the presence of an aqueous nutrient medium and in the absence of air, said hydrocarbon being continuously fed to a fermenter containing said microorganism and wherein there is a residence time sufficient to achieve cultivation of said microorganisms, thereafter continuously removing a product stream from said fermenter and recovering the resulting cultivated organisms.

2. A process according to claim 1 wherein said microorganism is of the genus Rhodopseudomonas.

3. A process according to claim 2 wherein said organism is of the group consisting of *Rhodopseudomonas capsulata*, *Rhodopseudomonas spheroides*, *Rhodopseudomonos pallustris* and *Rhodopseudomonos gelatinosa*.

References Cited

UNITED STATES PATENTS 3,084,186   4/1963   Hitzman et al. _____ 195—51
3,185,216   6/1965   Hitzman _____ 195—3 X A. LOUIS MONACELL, Primary Examiner J. L. WINDE, Assistant Examiner U.S. Cl. X.R.

99—14; 195—96, 126